UNITED STATES PATENT OFFICE 2,150,092

PROCESS FOR THE PREPARATION OF ANTHRAQUINONEDIPHENYLDITHIAZOLES

Earl E. Beard, South Milwaukee, Wis., assignor to E. I. du Pont de Nemours & Company, Wilmington, Del., a corporation of Delaware No Drawing. Application February 23, 1937, Serial No. 127,175

5 Claims. (Cl. 260—303)

This invention relates to the process for preparing 1,2,5,6-anthraquinone-C-diphenyldithiazole

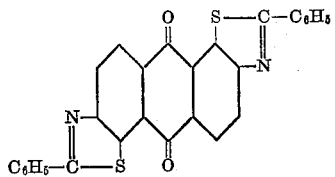

and more particularly to a method for increasing the yield of color obtained from the 2,6-diaminoanthraquinone. The invention also relates to a method for improving the printing properties of the 1,2,5,6-anthraquinone-C-diphenyldithiazole.

In the preparation of the 1,2,5,6-anthraquinone-C-diphenyldithiazole by reacting 2,6-diaminoanthraquinone with benzotrichloride and sulfur, preferably in an inert organic solvent, as more particularly described in U. S. Patent 1,095,731, a yield of only approximately 50% of theory is obtained. Due to side reactions which are as yet unexplained, about half of the 2,6-diamine employed is lost in the process.

It is therefore an object of this invention to provide a process for preparing 1,2,5,6-anthraquinone-C-diphenyldithiazole wherein substantially all of the 2,6-diaminoanthraquinone is converted to color.

It is a further object of the invention to reduce the cost of preparing 1,2,5,6-anthraquinone-C-diphenyldithiazole without reducing the quality of the product, and to provide a process wherein a relatively less expensive isomer of the 2,6-diaminoanthraquinone can be utilized to increase the amount of color actually obtained from the 2,6-diamine.

A still further object of the invention is to prepare a 1,2,5,6-anthraquinone-C-diphenyldithiazole which has improved printing properties. Other and further objects of the invention will become apparent from the following description.

The 2,6-diaminoanthraquinone is prepared by sulfonating anthraquinone to give a mixture of 2,6- and 2,7-anthraquinonedisulfonic acids, from which the 2,6-disulfonic acid is separated as the sodium salt by adding sodium carbonate or sodium hydroxide to the sulfonation mass which precipitates the 2,6-disulfonic acid free from any of the 2,7 isomer due to the relatively high solubility of the 2,7-disulfonic acid. (J. Amer. Chem. Soc., vol. 37, pages 2178–2181.) The 2,6-disulfonic acid is subsequently amidated to give the 2,6-diaminoanthraquinone (see German Patent 135,634 of 1902). The 2,7-anthraquinonedisulfonic acid has heretofore been considered to be of relatively little commercial importance and is usually not isolated from the sulfonation mass.

The 1,2,8,7 - anthraquinone-C-diphenyldithiazole of the formula:

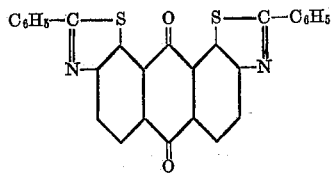

which can be obtained from the 2,7-diaminoanthraquinone is extremely weak in tinctorial strength, and since it is usually duller in shades than the 1,2,5,6-isomer it has been generally regarded as having no commercial value.

I have made the discovery that when 2,7-diaminoanthraquinone is used with the 2,6-diaminoanthraquione in the process of U. S. Patent 1,095,731 approximately 50% of the total amount of the diamines employed are converted to color, and that the 2,7-diamine is sacrificed in the formation of the undesirable side products in favor of the conversion of the 2,6-isomer to the desired color, thereby making it possible by using enough 2,7-diaminoanthraquinone to convert the 2,6 - diamine substantially quantitatively to 1,2,5,6-anthraquinone-C-diphenyldithiazole.

I have also found that the presence of 1,2,8,7-anthraquinone - C - diphenyldithiazole in the 1,2,5,6-anthraquinone-C-diphenyldithiazole enhances the printing properties of the latter.

Where a substantially pure 1,2,5,6-anthraquinone-C-diphenyldithiazole is desired, not over 50% of the total amount of 2,6- and 2,7-diaminoanthraquinones should be the 2,7-isomer. To completely convert all of the 2,6-diamine to color, at least half of the diamines employed should be the 2,7-isomer. It is of course understood that diminishing proportions of the 2,7-diamine may be used, with a proportional increase in loss of the 2,6-diamine. In the disulfonation of anthraquinone, the 2,6- and 2,7-disulfonic acids are obtained in a ratio of approximately 55:45. Therefore from a standpoint of economic production of the 1,2,5,6-dithiazole an excess of the 2,6-diamine will usually be employed. When it is desired that the final color contain some 1,2,8,7-anthraquinone-C-diphenyldithiazole an excess of the 2,7-diaminoanthraquinone over the 2,6-diamine may be employed.

The following examples are given to more fully illustrate the invention. The parts used are by weight.

Example 1

47 parts of benzotrichloride are added to a molten mixture (75-80° C.) consisting of 70 parts naphthalene, 14 parts sulfur, 9 parts 2,6-diaminoanthraquinone and 9 parts 2,7-diaminoanthraquinone. The temperature of the reaction mass is gradually raised to 215-220° C. and so maintained during 18 to 20 hours, after which time 56 parts of ortho-dichlorobenzene are added and the whole allowed to cool to 115° C. The reaction product is removed by filtration, washed with ortho-dichlorobenzene and alcohol in turns and dried. The dyestuff so obtained is substantially pure 1,2,5,6-anthraquinone-C-diphenyldithiazole.

Example 2

31 parts of benzotrichloride are added to a molten mixture (120° C.) consisting of 56 parts naphthalene 11 parts sulfur, 6.3 parts 2,6-diaminoanthraquinone and 6.3 parts 2,7-diaminoanthraquinone. The temperature of the reaction mixture is then raised to 200° C. during 3 hours and further refluxed during a period of about 20 hours. The dyestuff is isolated according to the method described in the preceding example and consists of substantially pure 1,2,5,6-anthraquinone-C-diphenyldithiazole.

Example 3

17 part of benzotrichloride are added to a molten (110° C.) mixture consisting of 28 parts naphthalene, 5.6 parts sulfur, 4.1 parts 2,6-diaminoanthraquinone and 3.4 parts 2,7-diaminoanthraquinone. The reaction is carried out and the product isolated according to the methods decribed in Example 1. Substantially pure 1,2,5,6-anthraquinone-C-diphenyldithiazole is obtained in a yield of 52% of theory based on the total amount of diamines used.

Example 4

16 parts of benzotrichloride are added to a molten (120° C.) mixture consisting of 28 parts naphthalene, 5.6 parts sulfur and 7 parts of a mixture of 2,6- and 2,7-diaminoanthraquinones obtained in the amidation of a 1:1 mixture of 2,6- and 2,7-anthraquinonedisulfonic acid disodium salts. The reaction mass is heated over a period of 7 hours, to a temperature of about 220-225° C., and thereafter refluxed for 10 hours. After dilution with 28 parts of ortho-dichlorobenzene the reaction mass is cooled to 130° C. and the reaction product is removed by filtration. In yield and quality the dyestuff corresponds to that obtained in Example 3.

If a final color containing only the anthraquinone-1,2,5,6-diphenyldithiazole is desired and the condensation product from the reaction contains some of the 1,2,8,7-isomer, the total mass may be precipitated from sulfuric acid of approximately 85% strength in accordance with the procedure described in U. S. Patent 1,891,448, whereby the 1,2,8,7-isomer is eliminated since it is much more soluble in the sulfuric acid than the 1,2,5,6,-diphenyldithiazole.

The conditions under which the fusion of the mixed diamines with sulfur and benzotrichloride is carried out are the same as those heretofore employed for the preparation of 1,2,5,6-anthraquinone-C-diphenyldithiazole from 2,6-diaminoanthraquinone, and may be varied in accordance with the processes described in the prior art. While naphthalene is the preferred diluent, other inert organic diluents, such as trichlorobenzene, may be employed.

While it has been found that the addition of 1,2,8,7-anthraquinone - C - diphenyldithiazole to the 1,2,5,6-anthraquinone-C-diphenyldithiazole enhances the printing property of the latter, the preparation of a mixture containing the 1,2,8,7-isomer by direct dithiazolation of the mixed 2,6- and 2,7-diaminoanthraquinones is impractical commercially, due to the fact that the 2,7-diamine is obtained in less amounts from anthraquinone than the 2,6-diamine, and in the mixed dithiazolation the 2,7-isomer is sacrificed in favor of the conversion of the 2,6-diamine to color. The mixed dithiazoles are therefore preferably prepared by mixing the two isomers.

It has been found that a mixture containing the 1,2,5,6-anthraquinone-C-diphenyldithiazole and about 15 to 40% of the 1,2,8,7-isomer (of the total weight of the two isomers) prints in somewhat stronger and brighter shades and ages faster than the 1,2,5,6-anthraquinone-C-diphenyldithiazole, when printed by the usual methods employed for printing this color.

I claim:

1. In the process for preparing 1,2,5,6-anthraquinone-C-diphenyldithiazole, the step which comprises carrying out the reaction of the 2,6-diaminoanthraquinone with sulfur and benzotrichloride in the presence of material amounts of 2,7-diaminoanthraquinone, whereby the yield of yellow dyestuff obtained based on the amount of 2,6-diaminoanthraquinone employed is improved.

2. In the process for preparing anthraquinone-diphenyldithiazoles wherein 2,6-diaminoanthraquinone is reacted with sulfur and benzotrichloride, the step which comprises carrying out the reaction in the presence of from 0.1 to 1 part of 2,7-diaminoanthraquinone per part of 2,6-diaminoanthraquinone employed.

3. In the process for preparing anthraquinone-diphenyldithiazoles wherein 2,6-diaminoanthraquinone is reacted with sulfur and benzotrichloride, the step which comprises carrying out the reaction in the presence of from 30 to 70% of 2,7-diaminoanthraquinone based on the total amount of 2,6- and 2,7-diaminoanthraquinones employed.

4. A dyestuff preparation comprising 1,2,5,6-anthraquinone-C-diphenyldithiazole containing material amounts of 1,2,8,7-anthraquinone-C-diphenyldithiazole.

5. A dyestuff preparation comprising a mixture of 1,2,5,6- and 1,2,8,7-anthraquinone-C-diphenyldithiazoles in which at least 10% of the dithiazole mixture is the 1,2,8,7-anthraquinone-C-diphenyldithiazole.

EARL E. BEARD.